United States Patent [19]
Schnaibel et al.

[11] 3,820,857
[45] June 28, 1974

[54] AUTOMOTIVE WHEEL BRAKE ANTI-LOCK SYSTEM

[75] Inventors: Eberhard Schnaibel, Hemmingen; Werner Gotz, Friolzheim, both of Germany

[73] Assignee: Robert Bosch GmbH, Gerlingen-Schillerhoehe, Germany

[22] Filed: Jan. 22, 1973

[21] Appl. No.: 325,569

[30] Foreign Application Priority Data
Feb. 4, 1972 Germany............................ 2205175

[52] U.S. Cl............ 303/21 BE, 188/181 A, 303/20, 303/21 AF
[51] Int. Cl.............................................. B60t 8/12
[58] Field of Search............ 188/181 A; 303/20, 21; 324/162; 340/53, 262

[56] References Cited
UNITED STATES PATENTS

| | | | |
|---|---|---|---|
| 3,398,995 | 8/1968 | Martin | 303/21 BE |
| 3,556,610 | 1/1971 | Leiber | 303/20 X |
| 3,578,819 | 5/1971 | Atkins | 303/21 BE |
| 3,637,264 | 1/1972 | Leiber et al. | 303/21 BE |
| 3,698,772 | 10/1972 | Nixon | 303/21 BE |
| 3,717,384 | 2/1973 | Harned | 303/21 BE |
| 3,778,117 | 12/1973 | Needham | 303/21 CG |
| 3,674,320 | 7/1972 | Howard et al | 303/21 BE X |

FOREIGN PATENTS OR APPLICATIONS
1,914,114  10/1970  Germany........................ 303/21 BE

*Primary Examiner*—Duane A. Reger
*Assistant Examiner*—Stephen G. Kunin
*Attorney, Agent, or Firm*—Flynn and Frishauf

[57] ABSTRACT

To prevent skidding, particularly of the driven wheels, an acceleration signal of the driven wheels is provided which is applied to at least two, preferably three or four threshold switches which have different responses to levels of wheel acceleration or deceleration; a first threshold switch, when responding to wheel deceleration, controls interruption of supply of pressurized brake fluid to the wheel brakes and bleeding of pressurized brake fluid to lower braking effort; a second threshold switch responds to wheel acceleration to prevent unduly long draining of pressurized brake fluid and thus loss of braking effort; preferably a third threshold switch is provided responsive to only a low level of wheel deceleration to prevent draining of pressurized brake fluid and hold braking effort at a level below skidding. Preferably, a pulse source is provided to permit pulsed application of pressurized brake fluid to the wheel brakes and thus gradually increase wheel braking pressure to further increase braking effort until the first deceleration switch again responds.

29 Claims, 6 Drawing Figures

AUTOMOTIVE WHEEL BRAKE ANTI-LOCK SYSTEM

Cross reference to related applications: Ser. No. 288,791, filed Sept. 13, 1972, Ser. No. 328,047, filed Jan. 30, 1973.

The present invention relates to a wheel brake anti-lock system, particularly for automotive vehicles and especially for the driven wheels thereof, in which the vehicle is provided with brakes operable by pressurized brake fluid, and in which the acceleration (rate of change of speed) of the wheels is sensed.

In the specification that follows, rate of change of speed will be referred to. When this rate of change is positive, the wheel, or vehicle is accelerated; when negative, the wheel, or the vehicle is decelerated. For convenience, "negative acceleration" may be used interchangeably with negative rate of change of speed, thus referring, effectively, to deceleration.

Various types of control systems to prevent wheel locking have been proposed. Some control systems provide individual wheel acceleration sensors which respond when a wheel decelerates beyond a certain value. It is customary to have the deceleration sensors of all wheels, or at least of two wheels on one axle respond at the same deceleration value. The electronic, or electrical control system is then so arranged that the braking pressure applied to the rear wheels is reduced equally on both rear wheels, as soon as the deceleration exceeds a predetermined level. The braking pressure is increased again when the deceleration of the rear wheels has decreased below the response level or threshold of the deceleration sensor or measuring device.

The braking pressure is thus increased in these anti-lock wheel systems although the rear wheels are still subject to deceleration. The difference between circumferential wheel speed and vehicle speed thus must increase at each control cycle, in order to prevent locking in spite of the system if the road conditions are slippery or smooth.

It is an object of the present invention to provide a wheel anti-lock system which is simple, reliable, and which is effective to prevent locking of the wheels also on smooth or slippery road surfaces.

SUBJECT MATTER OF THE PRESENT INVENTION:

Briefly, the control of the wheel brake system is effected in three modes: Increase of braking pressure, constantly maintained braking pressure, and decrease of braking pressure. The system includes pressure fluid inlet and outlet valves and acceleration sensors, the acceleration sensors controlling at least two threshold switches in such a manner, through a logic circuit, that the outlet valve, draining pressurized brake fluid from the wheel brake cylinders is activated when a certain negative acceleration value of the wheels is sensed, and the brake pressure is held constant, or increased based on sensed acceleration above a second, or third threshold level.

In accordance with an embodiment of the invention, the first threshold switch is connected to a storage or memory circuit which controls the drain valve; the inlet or pressure supply valve to the brake cylinders is controlled by an OR-gate having its input connected to the output of the memory or storage circuit and to the second threshold switch.

The threshold levels of the threshold switches are preferably so selected that when a certain wheel deceleration is sensed, braking pressure is decreased, and is increased only again when a certain positive wheel acceleration is first exceeded and thereafter drops again. Each wheel, therefore, is accelerated during a portion of the control cycle; yet, the difference between circumferential wheel speed and vehicle speed remains essentially constant. By suitable choice of the threshold levels of the threshold switches, it is possible to so control the difference between wheel speed and vehicle speed that optimum slip, resulting in optimum braking effort can be obtained.

The invention will be described by way of example with reference to the accompanying drawings, wherein.

Figure 1:
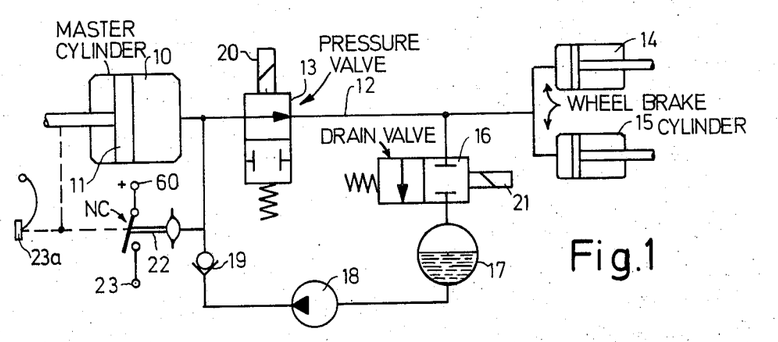
FIG. 1 is a highly schematic representation of a braking system for the rear wheels of an automotive vehicle.

The system of the present invention is generally shown in FIG. 1, in which the main or master braking cylinder 10 has a master brake piston 11 therein, to compress brake fluid, typically hydraulic brake fluid. The system may, of course, be servo operated, and the master brake cylinder 10 can be connected to two wheels only, so that the entire braking circuit for a four, or more wheeled vehicle is separated into a plurality of braking circuits, for safety reasons. Piston 11 is operated by a brake pedal 23a, as schematically shown. A pressure brake fluid valve 13, which is electromagnetically operable, is supplied with pressurized brake fluid from master cylinder 10, which in turn distributes pressurized brake fluid over brake lines 12 connected to two wheel brake cylinders 14, 15. The wheel brake line 12 is further connected to a drain valve 16, electromagnetically operated by a winding 21, and leading to a brake fluid sump or reservoir 17. Reservoir 17 is connected to a pump 18 which provides pressurized brake fluid over a check valve 19 to the master cylinder. A pressure switch 22, which is normally closed, is tapped into the line connecting with master cylinder 10. One terminal of the switch is connected to a positive bus or terminal 60, the other to a connection terminal 23. Thus, when the brake pedal is not operated, that is, if brake pedal 23a is not depressed so as to operate master cylinder 10, terminal 23 is connected to positive bus 60.

The rest position of the valves is shown in FIG. 1; the valves are maintained in this normal or rest position by springs. Electro magnet windings 20, 21, when energized, change over the state of the valves 13, 16. The valves are ON-OFF valves. Under ordinary or rest position, pressure valve 13 is open so that fluid communication is established between the master cylinder 10 and pressure line 12. Drain valve 16 is closed, so that drainage of pressurized fluid from the wheel brake cylinders to the sump 17 is blocked. Brake fluid pressure can be increased in the wheel brake cylinders by operation of master cylinder 10, when the valves are in rest position. Upon closing of pressure valve 13 when the winding 20 is energized, pressure within line 12 and hence within the wheel brake cylinders will remain even or constant. If, with closed pressure valve 13, the drain valve 16 is then opened, braking pressure will drop rapidly and pressurized brake fluid will be drained or will bleed from the brake line 12 and the wheel cylinders 14, 15 into the sump 17. The pump 18 re-supplies brake fluid back into the brake line circuit, to form a completely closed fluid circuit without loss of fluid. The function of the pressure switch 22, removing potential from terminal 23 upon operation of the brake pedal 23a will be described in detail below with reference to FIG. 3.

Figure 2:
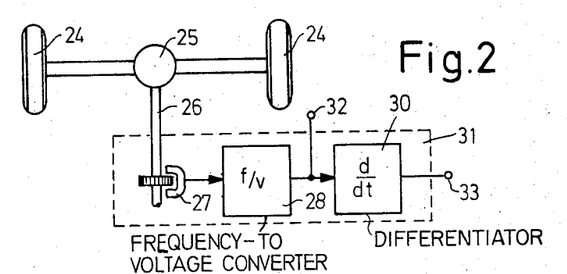
FIG. 2 is a schematic illustration of the arrangement of the acceleration sensing device.

The driven axle, typically the rear axle of a motor vehicle, and connected transducers are shown in FIG. 2. Wheels 24 are connected by means of their wheel axles to a differential 25 which is driven by the main shaft 26, connected to the transmission and to the engine. An electrical pulse source, such as a tachometer generator 27 is electrically and mechanically connected to the differential drive shaft 26. Such tachometer generators are known, and their utilization in wheel anti-lock systems is likewise known. The generator or transducer 27 provides output pulses which are transformed in a frequency-voltage converter 28 into a direct current voltage which varies in value proportionally to the speed of revolution of the differential drive shaft 26. A differentiator 30 is connected to the output of the frequency-voltage converter 28. A signal representative of drive speed is available from the output of the frequency-voltage converter 28 at terminal 32. A differentiated signal representative of acceleration, or deceleration, that is, the derivative of the speed signal is available at terminal 33 from the output of differentiator 30. Transducer 27, converter 28 and differentiator 30 together form an acceleration sensing unit 31. The output signal derived from terminal 33 will be representative of acceleration or deceleration, dependent on polarity, of the differential drive shaft 26, and thus will be proportional to the average acceleration, or deceleration of both rear wheels 24.

For vehicles with front wheel drive, as will be explained in connection with FIG. 4, a similar system is used in connection with the trailing wheels of the vehicle.

Figure 3:
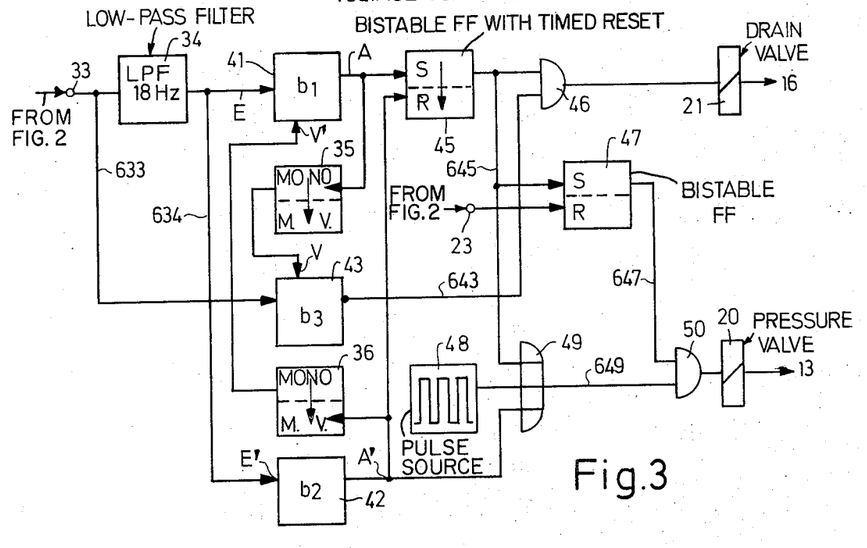
FIG. 3 is a general block circuit diagram of an embodiment of the invention.

FIG. 3 shows the system; the input terminal 33 is connected to a low pass filter 34 to provide a filtered output signal from differentiator 30. Two threshold switches 41, 42 are connected to the output of low pass filter 34. A third threshold switch 43 has its input connected directly to the output terminal 33. The output A of the first threshold switch 41 is connected to the SET input of a monostable multivibrator 35. The output of the first monostable multivibrator 35 is connected to a threshold control terminal V of the third threshold switch 43. The output terminal A' of the second threshold switch 42 is connected to the input of a second monostable multivibrator 36, the output of which is connected to a threshold control terminal V' of the first monostable multivibrator 41.

A bistable flip-flop 45 has its SET terminal connected to the output of the threshold switch 41; its RESET terminal R is connected to the output A' of the second threshold switch 42. The bistable flip-flop has an inherent time setting so that it will reset after a certain lapse of time, even if no pulse is applied to the RESET terminal R. Flip-flop 45 thus functions as a bistable flip-flop with timed reset, or, as a monostable flip-flop with a controllable reset if the flip-flop is to be reset in advance of lapse of the instability duration. Flip-flop 45 functions as a storage or memory device. Winding 21 of drain valve 16 is connected to the output of flip-flop (FF) 45 through an AND-gate 46, which has as its inputs the output from the FF 45, indicated as line or terminal 645, and additionally the output from the third threshold switch 43, shown as line 643. A second storage element, built as a bistable FF 47 has its SET input S connected to line 645 at the output of FF 45, and its RESET input R connected to terminal 23 of the pressure switch connected to the brake pressure line (FIG. 1). Winding 20 of pressure valve 13 is energized through an AND-gate 50, which takes its input from line 647 forming the output of FF 47, and line 649 forming the output of an OR-gate 49. OR-gate 49 is connected to line 645 from FF 45, to output terminal A' of the second threshold switch 42, and to the output of a pulse source 48. Line 633 connects the terminal 33 to low pass filter 34 and the input of threshold switch 43; the output line 634 from the low pass filter 34 is connected to the input E of first threshold switch 41 and to the input E' of the second threshold switch 42.

The storage or memory circuit 47 preferably is a bistable flip-flop. The first storage or memory circuit 45 which may be constructed in form of a monostable flip-flop with an additional reset input controls pressure reduction. In ordinary control cycles, it operates as a bistable flip-flop. If, however, an erroneous or noise pulse should be applied to the circuit 45, although there is no excessive retardation in the wheel speed, flip-flop 45 will automatically reset after its pulse duration. This pulse duration is preferably set to about 200 milliseconds. Thus, any drain of pressure fluid through drain valve 16 which might be caused by an erroneous or noise or disturbance pulse is terminated in time and before effective vehicle braking could be impaired.

Figure 5:
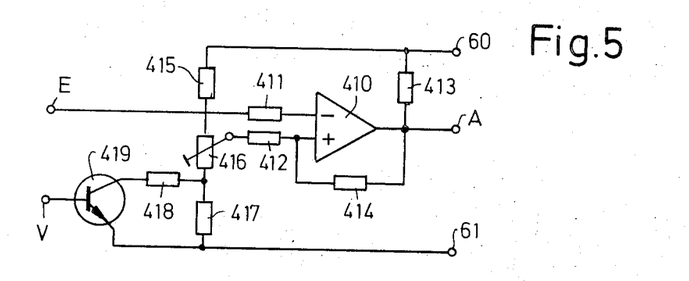
FIG. 5 is a detailed circuit diagram of a threshold switch.

The threshold switches can be constructed as shown in FIG. 5, for example, which illustrates the circuit diagram of the first threshold switch 41, and which has a threshold control, or change-over terminal V. Threshold switch 41 includes an operational amplifier 410 having an inverting input which is connected over input resistor 411 to terminal E, forming the input to threshold switch 41. The non-inverting input of operational amplifier 410 is connected over input resistor 412 to the tap point of a voltage divider formed of resistors 415, 416, 417, resistor 416 being variable and in form of a potentiometer. The output A of operational amplifier 410 is connected over resistor 413 with positive bus 60 and over a feedback resistor 414 to the non-inverting input. A series circuit formed of resistor 418 and the emitter-collector path of a transistor 419 is connected in parallel to the resistor 417 of the voltage divider circuit. The emitter of transistor 419 is connected to negative bus 61. The base of transistor 419 forms the threshold changing or control input terminal V of switch 41.

Operation of threshold switch in accordance with FIG. 5: The threshold level of switch 41 is set by adjusting the slider of trimmer potentiometer 416. The non-inverting input of the operational amplifier is connected through resistor 414, in a positive feedback circuit, to the output so that the output potential of the switch may have the voltage of either the positive bus 60 or of negative bus 61. The output will be at the value of the positive bus 60 when the input voltage at terminal E is less than the tap voltage of the voltage divider 415, 416, 417. The tap voltage can be changed by controlling the state of conductance of transistor 419. Transistor 419 is controlled by the output of the second monostable FF 36. Transistor 419 can be either blocked or conductive. Thus, and dependent on the state of conduction of the transistor 419, two different values of switching threshold potential of switch 41 are provided.

The various stages of the circuit of FIG. 3 have specific characteristics. The monostable FF's 35, 36 have dynamic inputs which may be constructed by a series circuit of a differentiating capacitor and a diode. In the first monostable FF 35, the diode is so poled that positive change in voltage causes an output pulse of about 50 milliseconds. During these 50 milliseconds, the output of the first monostable FF provides a ONE (1) signal, that is, the output will be at the voltage of the positive bus 60. The second monostable FF is triggered by negative changes in input signal. The output will, again, have a pulse duration of about 50 milliseconds at a value of a 1 signal.

Wheel rate of change of speed is preferably related to gravity $g$ of about 10 m/sec.² The threshold level $b_1$ of the first threshold switch 41 is set normally to be about $-3g$. The threshold level of the first threshold switch 41 can be changed to $-6g$ when the second monostable FF 36 provides a 1-signal, thus rendering transistor 419 (FIG. 5) conductive.

The second threshold switch 42 is constructed to switch upon positive values of acceleration, and with some hysteresis. Upon negative acceleration (deceleration, or retardation of the wheel), the second threshold switch 42 provides a 0-signal, that is, it has the voltage of the negative bus 61. Upon change of rate of speed in positive direction, that is upon acceleration, the second threshold switch 42 provides a 1-signal when the threshold level $b_2$ reaches about $+1g$. Due to the hysteresis, the output of the second threshold switch 42 will not revert to the 0-signal, however, when the acceleration level is passed, but rather only when acceleration goes below $0g$.

The hysteresis of the second threshold switch 42 can readily be adjusted by suitable dimensioning of the feedback resistor 414 (FIG. 5). The hysteresis becomes greater as the resistance value of resistor 414 is decreased.

The threshold level $b_3$ of the third threshold switch 43 normally is set to be about $+1g$. During the pulse duration of the first monostable FF 35, that is, when its input V is energized, the threshold level is changed to about $-2g$.

Figure 6:
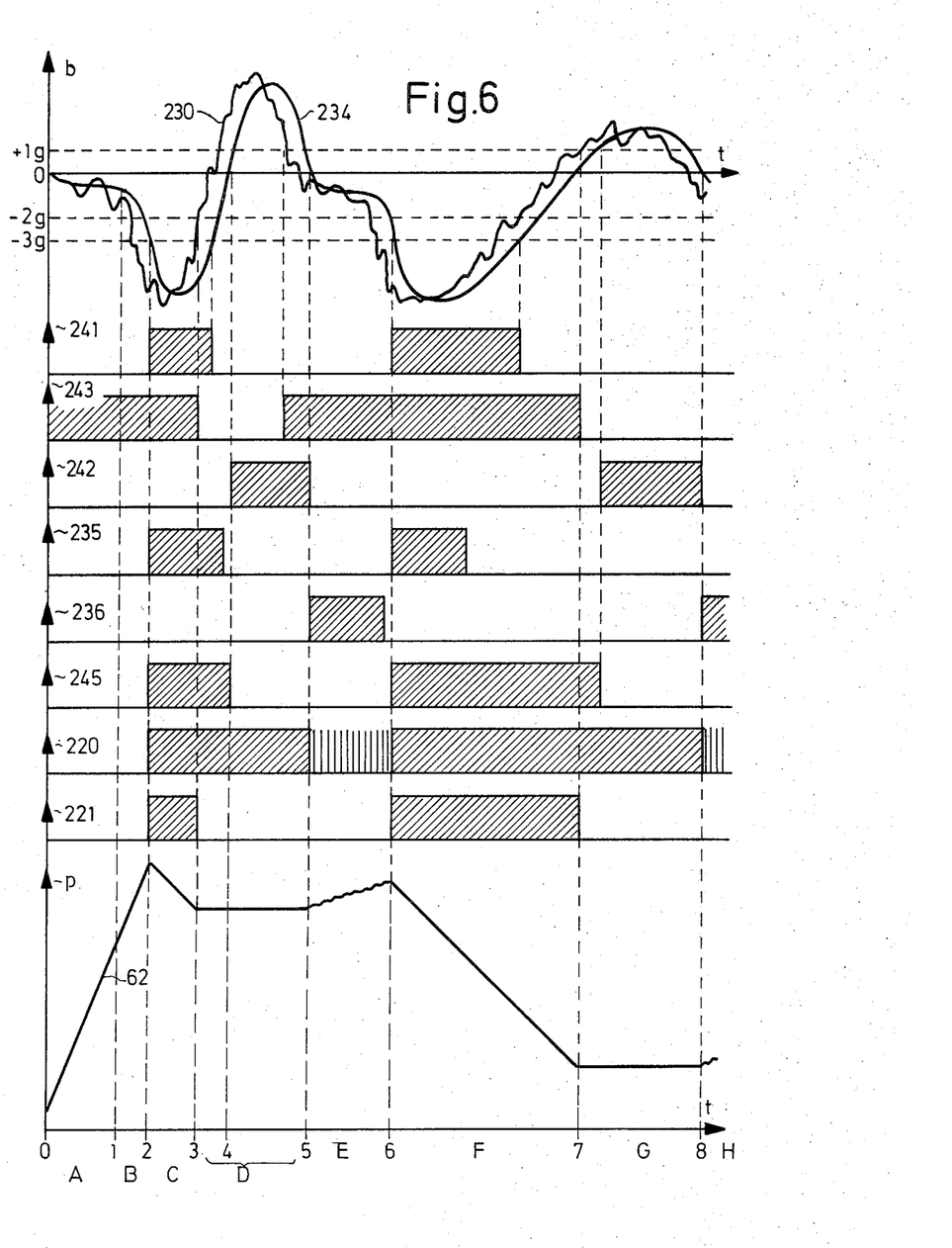
FIG. 6 is a series of pulse graphs and illustrating corresponding pressure relationships in the wheel brake cylinders to illustrate the operation of the system of the first embodiment (FIGS. 1–3).

The various signals are shown in the timing diagram of FIG. 6, in which the signals from the elements of FIG. 3 have been given the same reference numerals, incremented by 200. 230 and 234 show the outputs from the differentiator 30 and the low pass filter 34, respectively, during two control cycles. It is assumed that the road surface becomes more slippery as the vehicle is being braked. The second control cycle thus is drawn assuming a coefficient of friction between wheel and road surface which is less than that in the first control cycle (for example, the vehicle may pass over a wet road surface, an iced stretch, or the like). The output signal of differentiator 30 has usually disturbance distortion and noise pulses superimposed thereon, which are filtered by the low pass filter 34. Due to the presence of the low pass filter, a slight time shift or time delay will be present with respect to the output signal of the differentiator 30 directly. This time delay, in the example shown, is about 15 milliseconds, arising from the upper frequency limit of about 18 Hz of the upper pass width of the low pass filter. The damping of the filter 34, in a suitable example, is about 24 db per octave.

The graphs 241 to 245 illustrate the output signals of the stages 41, 42, 43, 35, 36 and 45, respectively. The input voltages to the two valve control windings 20, 21 are shown at graphs 220, 221. The braking pressure p, arising within the wheel brake cylinders 14, 15 (FIG. 1) is shown by curve 62.

Operation (with reference to FIGS. 3 and 6): Let it be assumed that, first, full braking pressure is applied on a road surface which is dry, but then becomes wet or slippery. At the beginning of braking, pressure inlet valve 13 is open (valve control winding 20 de-energized) and the drain valve 16 is closed (drain valve winding 21 de-energized). Let it be further assumed that the braking pressure starts at time $t0$. In the graph of FIG. 6, the notation "$t$" has been omitted from the numerals illustrating the instances of time.

Upon braking, braking pressure $p$, curve 62, rises rapidly — see curve section A, time $t0$ through $t1$ to $t2$. For the period of time that the wheels have frictional rolling contact with the road surface, a wheel deceleration of about $-1g$ will result — curve section A to time $t1$ — see curves 230, 234. When the braking pressure p exceeds the wheel locking level, however, a rapid increase in wheel deceleration will result and the output signal 234 of the low pass filter 34 will fall below $-3g$ — time $t2$. This is the threshold level of the first threshold switch 41, which will respond and provide a 1-signal. At time $t2$, therefore, and when threshold switch 241 responds, monostable FF 35 is triggered, and additionally the first storage circuit 45 is set by energization of the SET input S. The 1-signal at the output of the first storage device FF circuit 45 then sets the second FF 47 which likewise provides a 1-signal at its output. The third threshold switch 43 has not yet responded. This threshold switch has an inverting output, as schematically indicated by the dot, and therefore provides a 1-signal to the AND-gate 46. Drain valve control winding 21 is energized, opening the drain valve. The pressure valve winding 20 also is energized, the 1-signal being applied to OR-gate 49 over line 645 which provides a 1-output on line 649 connected to AND-gate 50. Conjunctively, bistable FF 47 provides a 1-signal at line 647, so that AND-gates will energize pressure valve 13 which will thereupon close and disconnect pressurized brake fluid from the wheel brake cylinders. As a result, no further pressure fluid is supplied but rather pressure fluid is drained and the pressure in the wheel brake cylinders will drop quickly — curve section C, between times $t2$, $t3$.

Storage FF 47 is reset only when the operator removes pressure from the brake pedal 23a, thus supplying positive potential to the reset terminal R of FF 47.

The pulse duration of the first monostable FF 35 has not yet terminated at time $t3$. The threshold level of the third threshold switch 43 thus continues to be at $-2g$. The pressure in the brake line will thus drop until the wheel deceleration reaches the threshold value $b_3$ of the third threshold switch 43, causing the output signal of the third threshold switch 43 to jump to a 0-signal, so that AND-gate 46 will be de-energized and provide a 0-signal. This causes closing of the drain valve 16, due to de-energization of the control winding 21, and thus inhibits further bleeding of pressurized brake fluid from the wheel brake cylinders 14, 15. The brake pressure within the wheel brake cylinders will therefore remain constant — see curve section D. The constant, evenly maintained braking pressure causes further decrease in wheel deceleration and the rate of change of speed will pass through zero and become positive. The second threshold switch 42 provides a 1-signal when the acceleration has reached $+1g$, as seen at time $t4$. This causes resetting of the first FF 45 (energization of R terminal). This has no effect on the drain valve 16, since AND-gate 46 already was disabled due to failure of a signal from third threshold switch 43. The second monostable FF 36 is, however, triggered thereby and the threshold level of the first threshold switch 41 is shifted, for a period of about 50 milliseconds, to a value of $-6g$. There will be no affect on the pressure valve 13 either, since the 1-signal of the second threshold switch 42 keeps winding 20 energized through OR-gate 49.

The second threshold switch 42 does not reset when the acceleration rate again reaches $1g$ but, due to its hysteresis, will change state only when the acceleration has dropped to a value of $0g$. This occurs at time $t5$, and is an indication that the acceleration portion of the braking cycle of the vehicle wheel has been terminated, and that the circumferential speed of the wheel is again approximately that of the vehicle speed. This permits increase in braking pressure. It is not desirable, however, that the braking pressure should rise at the steep rate at which it was originally applied, and after the wheel anti-skid or anti-lock device had to respond. The pulse source 48 is thus used in order to provide for gradual rise in braking pressure, without operator control. Pulse source 48 is set to provide output pulses of about 50 Hz frequency, alternately providing 0 and 1- signals. Winding 20 is thus periodically energized over OR-gate 49, causing periodic operation of pressure valve 13, that is, intermittent opening, and providing for gradual pressure rise in the wheel brake cylinder. The mark-space ratio of the pulse source 48 determines the rate of rise of pressure $p$ — see curve E (FIG. 6) between time $t5$ and $t6$. The pulse ratio and pulse width of pulse generator 48 are preferably so set that braking pressure in the brake lines rises about 0.3 atm. per millisecond.

The effect of pulse source 48 can be roughly compared to pumping of the brakes.

The time between $t5$ and $t6$ is in excess of the time duration of monostable FF 36, so that the threshold level of first threshold switch 41 again reverts to $-3g$, since FF 36 has reset itself (see curve 236, FIG. 6).

Let it be assumed that the road surface has become more slippery. Due to the increased pressure $p$, the wheel will now decelerate and experience a deceleration of about 0.5 g with full friction contact between wheel and road surface. Due to the increased slipperiness of the road, however, a lower deceleration value will result in wheel slip, and as soon as the braking pressure $p$ exceeds this now lower friction, the wheels will again lock and rapidly decelerate. The various switching sequences repeat similarly as previously explained in connection with the first control cycle. First, a pressure drop period will occur — curve section F, between times $t6$ and $t7$; thereafter, braking pressure will be held even or constant, curve G, between times $t7$ and $t8$; thereafter, the braking pressure will again be increased, gradually, and in accordance with the pulsed output from generator 48, curve portion H (shown only in fragmentary form in FIG. 6). The essential difference with respect to the first control cycle is, however, that more time will be required to cause decrease of the wheel deceleration, due to the more slippery road surface. This additional time, necessary for the reacceleration of the vehicle wheels is measured by means of the first monostable MV 35. After 50 milliseconds, the un-filtered wheel delay signal may still have a value of $-3g$. This does not trigger the switching threshold of the third threshold switch 43 which is changed to $+1g$ after the 50 millisecond duration. As a result, the third threshold switch 43 provides a 1- signal for a much longer period of time, thus holding the drain valve 16 open for a much longer period. Braking pressure $p$ thus is decreased to a much greater extent in the second control cycle (see FIG. 6, curve sections F, G) and overall braking effort is decreased. The wheel anti-lock or anti-skid device thus fits itself or matches itself, automatically, to road conditions.

The pulse duration of the first monostable FF 35 must be matched to vehicle weight and driving characteristics, with which the anti-skid or anti-lock device is to be used. Usually, the pulse duration must be so set that, with constant braking pressure on dry road, the deceleration of the braked wheels, typically the rear wheels, has again decreased to $-2g$.

Change in threshold level of the first threshold switch 41 is necessary with many types of vehicles since the wheel suspension, particularly rear wheel suspension, causes mechanical oscillations which can simulate sudden, large wheel decelerations although the wheel actually is accelerating. During braking, and during the delay period within the control cycle of the anti-lock or anti-skid system, the rear axle will shift in position with respect to the vehicle suspension. During the subsequent re-acceleration of the wheels — the positive half-wave of curve 230, 234 of FIG. 6 — the wheels change position forwardly and the tension and shift of the wheels with respect to the body of the vehicle is released. The rear axle may even swing in the opposite direction from its normal or rest position. In the following oscillation wave, the first threshold switch 41 may thus indicate a wheel deceleration which is greater than $-3g$. This would cause immediate drop in braking pressure after the constant pressure phase (curve sections D, G, FIG. 6). Experiments have shown that such oscillations of the rear axle, which simulate deceleration values, are never greater than 4 to 5 g. After the end of the re-acceleration phase, that is, after resetting of the second threshold switch 42, the threshold level $b1$ of the first threshold switch 41 is thus set to a value of $-6g$ to prevent any spurious response. If the rear wheels should actually lock, however, braking pressure will be applied with a slight delay; this slight delay, however, is minor and less bothersome than lack of filtering of rear axle swing.

The wheel anti-skid or anti-lock system can also be used with vehicles having front wheel drive. FIG. 4 illustrates a suitable embodiment, in which the front wheels are driven, but the wheel anti-lock system is applied to the rear wheels. Vehicles of this type do not have a differential in their rear axle, so that the average rate of change of speed of the wheels must be determined electrically.

Figure 4:
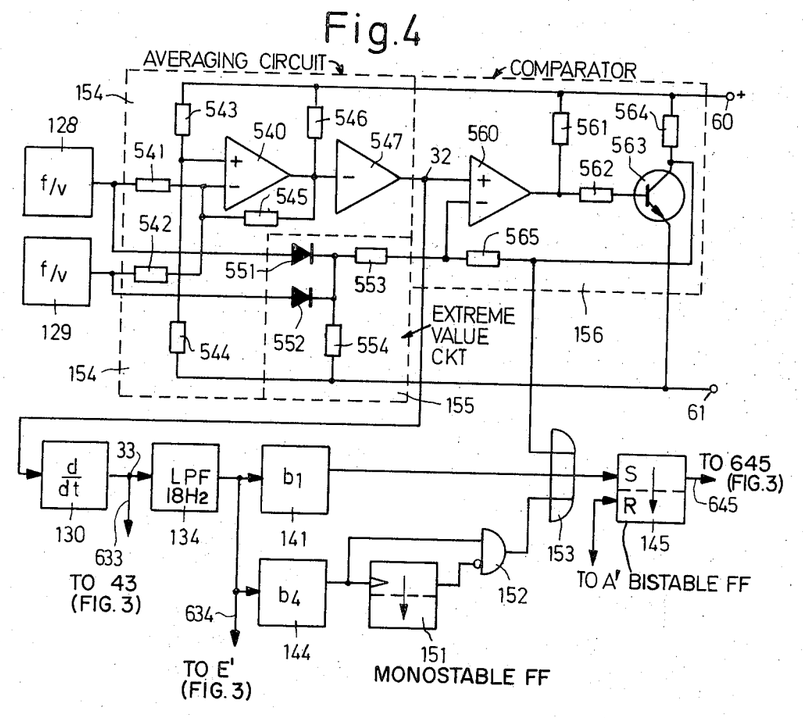
FIG. 4 is a fragmentary combined block and partly circuit diagram of a modification of the invention, particularly useful for front-wheel drive vehicles.

Each of the two rear wheels has a tachometer generator associated therewith (not shown), to which frequency-voltage converters 128, 129, respectively, are connected (FIG. 4). The direct current outputs of converters 128, 129 are connected to an averaging circuit 154, and to an extreme value circuit 155. The output of the averaging circuit 154 and of the extreme value circuit 155 is, respectively, connected to respective inputs of a comparator 156.

The circuits of FIG. 4, in general, can be similar to those of FIG. 3 and similar elements have similar reference numerals incremented by 100. Differentiator 130, low pass filter 134, and first threshold switch 141 correspond exactly to the elements 30, 34, 41 of FIGS. 2 and 3. The input of differentiator 130 is connected to the output of the averaging circuit 154, at terminal 32, which corresponds to terminal 32 of FIG. 2, where the output of the frequency voltage converter 28 provides an average value due to the connection to the wheels ahead of the differential. A fourth threshold switch 144 is provided, connected to line 634 (FIGS. 3, 4), that is, to the output of the low pass filter. A third monostable multivibrator or FF 151 is connected to the output of the fourth threshold switch 144. The outputs of the fourth threshold switch 144 and of third monostable FF 151 are connected to the inputs of an AND-gate 152, the connection from FF 151 to AND-gate 152 being over an inverting input as schematically shown by the dot connection to the AND-gate. The SET input S of the first FF 145 has an OR-gate 153 connected thereto, so that FF 145 can be set either upon an output from the comparator 156, the first threshold switch 141 or AND-gate 152.

The circuit of FIG. 4 additionally includes the other elements of the circuit of FIG. 3, connected as shown; monostable FF's 35, 36, threshold switches 42, 43, FF 47, pulse source 48, the gates 46, 49, 50 are similar to those of FIG. 3 and are not shown again.

The averaging circuit 154 includes an operational amplifier 540 having its non-inverting input connected to the tap point of a voltage divider formed of resistors 543, 544 connected across the positive and negative buses 60, 61. The inverting input is connected over coupling resistors 541, 542, respectively, to the outputs of the converters 128, 129. The output of operational amplifier 540 is connected over resistor 546 to positive bus 60 and with a feedback resistor 545 to the inverting input. The output of operational amplifier 540 has, additionally, an inverting amplifier 547 which may, again, be a similar operational amplifier, connected thereto.

The extreme value circuit 155 has two input diodes 551, 552. The anodes of these diodes 551, 552 are connected to the outputs of converters 128, 129 and forming the input terminals thereof. The cathodes of diodes 551, 552 are connected over a resistor 554 to negative bus 61 and over an output resistor 553 to one of the inputs of comparator 156.

The input to comparator 156 is formed by an operational amplifier 560. The non-inverting input is connected to the output of inverter amplifier 547. The inverting input is connected to the output resistor 553 of the extreme value circuit. The output of operational amplifier 560 is connected over resistor 561 to positive bus 60. A transistor 563 is connected to the output of operational amplifier 560, having its emitter connected to negative bus 61, its collector to collector resistor 564 and then to positive bus 60 and its base, over resistor 562, to the output of operational amplifier 560. The collector of transistor 563 is connected to a feedback resistor 565 which connects to the inverting input of operational amplifier 560. The collector of transistor 563 forms the output of comparator 156 and is connected to the input of the OR-gate 153.

Operation: Omitting comparator 156, extreme value circuit 155 and the fourth threshold circuit 144, will then result in identical operation of the circuit to that described in connection with FIG. 3. The two output voltages of frequency converter 128, 129 are added by adder resistors 541, 542 and operational amplifier 540. The feedback resistor 545 is so dimensioned that the operational amplifier 540 will have an amplification factor $a = 0.5$; the output voltage of operational amplifier 540 will then be exactly the arithmetic mean of the output voltages from converters 128, 129. The inverting input of operational amplifier 540 is controlled, so that the output voltage will decrease with increasing rotational speed, and for this reason the inverter amplifier 547 is used which has an amplification $a = 1.0$. The output of inverter amplifier 547 thus has an output signal thereon which is a direct current voltage exactly comparable to that of the output voltage of frequency-d-c converter of FIG. 3, in which the differential 25 of the automotive vehicle forms the arithmetic mean of the speed of the wheels.

If the road conditions are so that the road is slippery, for example wet, icy or the like, and the driver is careful and uses the brake only very gradually, then, if the embodiment of FIG. 3 is used, the situation may arise that the rear wheels are braked to fully stopped, locked condition with a slow retardation, that is, a deceleration of only $-2g$. This will result in blocking of the rear wheels after 2-3 seconds, without, however, causing the first threshold switch 41 to respond, since the threshold level of switch 41 is below the deceleration. The embodiment of FIG. 4 prevents response of the anti-skid or anti-wheel lock device upon such slow, careful braking. The fourth threshold switch 144 and the third monostable FF 151 are provided, and so arranged that the circuit will respond at a slower deceleration. The third FF 151 has a pulse duration of about 50 milliseconds, and the threshold level b4 of the fourth threshold switch 144 is set to about $-1.5\ g$.

Normal braking, which does not lead to blocking of the rear wheels, usually results in maximum wheel deceleration of $-g$. Due to the suspension of the rear wheels, spurious oscillations, slight differences in friction of the surfaces (small zones of slippery surface, for example puddles of water), it may occur that the deceleration, for a very brief period of time, almost instantaneously, exceeds the threshold level of $-1.5g$. This would cause response of the fourth threshold switch 144, which will provide a 1-signal at its output. At the same time, however, the third monostable multivibrator 151 is triggered and provides a 1-signal at its output. AND-gate 152 will remain blocked, however, since the input from FF 151 is inverted. Very short time response of the fourth threshold switch 144, therefore, cannot cause setting of the first storage FF 145.

Considering the above referred to example, if slow, gradual and continuous application of the brakes, on a smooth road surface exceeds the unstable time of FF 151, that is, 50 milliseconds, then FF 151 will re-set, and AND-gate 152 will be opened since the inverting input now has a 0-signal applied. This sets the first storage device 145, and braking pressure p (FIG. 6) will drop, as explained in connection with the example of FIG. 3 and FIG. 6 — time slots or graph zones C and F, respectively. This portion of the circuit thus can equally be applied to the circuit of FIG. 3 and is independent of the type of vehicle drive.

Braking may be initiated while the rear wheels are subject to widely varying frictional contact with the road surface. For example, the vehicle may be driven such that its right wheels pass through a water puddle, so that the frictional coefficient between road and wheel at the right side of the vehicle is substantially less than on the left side. It may thus occur that the right rear wheel will come to fully stopped or locked condition with a retardation or deceleration of $-2g$. The left rear wheel, however, assumed to be running on a dry road surface, will be decelerated only to about $-0.8g$. The acceleration (or deceleration) sensor, that is, the output of differentiator 130 will then provide an average wheel deceleration signal of $-1.4\,g$. This is below the threshold levels of the first or the third threshold switches, none of which will respond. Thus, neither threshold switch 141, nor threshold switch 144 will be activated.

The inverting input of operational amplifier 560 in comparator 156 has a d-c voltage applied thereto which is proportional to the greater of the circumferential wheel speeds. This is obtained by the extreme value circuit, since that one of the two diodes 551, 552 will be conductive which has its anode at the higher voltage level. At the same time, the non-inverting input of operational amplifier 560 will have the average value of the wheel speed applied thereto in form of a direct current voltage.

If one rear wheel should lock, then the signal representative of average value supplied by inverter amplifier 547 is only half as great as the output value derived from the extreme value circuit 155. Operational amplifier 560 thus provides a 0-signal at its output which blocks transistor 563. The collector of transistor 563 is thus effectively at positive bus potential, that is, approximately at the voltage of positive bus 60 to provide a 1-signal which is applied over the OR-gate 153 to set the first storage device 145. This causes a drop in braking pressure, as described above in connection with FIG. 3.

The voltages of the voltage divider 543, 544 are adjusted suitably so that comparator 156 will respond when the difference in speed between the mean value, as represented by the output signal from averaging circuit 154 and the extreme value as represented by the extreme value circuit 155 has a certain value. In adjustment, care should be taken to allow for the inherent voltage drop of diodes 551, 552, which can be compensated in the adjustment. When using silicon diodes, this voltage drop is about 0.7 V.

The vehicle anti-lock system reliably inhibits locking of the rear wheels of an automotive vehicle. Systems in which only the rear wheels of a motor vehicle are controlled to inhibit locking are used normally only when an anti-lock system effective for all four wheels is too expensive. The most inexpensive solution is that described in connection with the first example, FIG. 3. This solution is entirely adequate if the suspension of the rear wheels is comparatively stiff, particularly if anti-sway bars, and traction bars are used, that is, suspensions in which oscillations of the rear axle are not severe. Under such conditions, it is even possible to eliminate the second monostable multivibrator 36, which changes the threshold response level of the first threshold switch 41 for a certain period of time. Greater reliability and certainty of operation are obtained by using, in addition to the circuit of FIG. 3, a fourth threshold switch 144 which prevents gradual blocking of rear wheels. If two separate pulse sources and frequency-d-c converters can be provided for both rear wheels, then increased reliability and effectiveness of operation can be obtained by use of comparator 156 and the extreme-value circuit 155, which can be used independently. It is, therefore, entirely possible to use the system of FIG. 4 also with rear wheel drive vehicles, and pick off wheel speed data from each wheel individually, rather than from the main drive shaft of the motor vehicle. Increased utilization of equipment and material thus permits the use of functional features which may, under certain conditions, be desirable.

Various changes and modifications may be made within the inventive concept, and features of the invention described in connection with any one of the Figures can be applied, equally, and within the inventive concept to the system described in connection with other Figures.

We claim:

1. Wheel anti-lock system for fluid operated brakes (14, 15) having rate-of-change wheel speed sensing means (31; 27, 28, 30, 130);
   a source of brake fluid under pressure (10, 18) and a pressure fluid sump (17);
   controllable pressure valve means (13, 20) selectively connecting the source of pressurized brake fluid to the wheel brakes (14, 15);
   controllable drain valve means (16, 21) selectively connecting the wheel brakes (14, 15) to the sump (17);
   and a control system to selectively control said pressure valve means and said drain valve means comprising
   at least two threshold switches (41, 42) a first switch (41) being responsive to a deceleration signal and a second switch (43) responding to an acceleration signal, said switches being connected to and controlled by the sensing means;
   the first threshold switch (41) including a threshold control input (V') connected to change the threshold level setting of said first threshold switch to a value of deceleration much lower than the deceleration value when the control input (V') is energized;
   timing means (36) connected to and controlled by the output of said second threshold switch (42), and having its output connected to the threshold control input (V') of the first threshold switch (41) to change the threshold response level of the first threshold switch (41) after response of the second threshold switch for a limited time period, to prevent spurious response of the first threshold switch due to disturbing pulse peaks arising in the system, independently of braking action of the wheel with respect to the road surface;

a first signal storage means (45) having set (S) and reset (R) inputs, the set and reset inputs being connected to and controlled by the first (41) and second (42) threshold switches, respectively;

the drain valve means (16, 21) being controlled by the output from the first storage means (45) upon sensing of deceleration exceeding the threshold level (b1) of the first threshold switch;

means (49) disjunctively controlling the pressure valve means to close and interrupt application of further pressurized fluid to the wheel brakes upon application to said disjunctive means of an output signal of a. the first storage means (45) or b. the output of the second threshold switch (42).

2. System according to claim 1, further comprising a third threshold switch (43) connected to and controlled by the sensing means (31), said third threshold switch having an inverted output and responding to a deceleration signal less than that of the first threshold switch;

an AND-gate (46);

the input to the AND-gate (46) being connected to and controlled by the output of the first storage means (45) and the negative of the output of the third threshold switch (43), the output of said AND-gate (46) being connected to and controlling said drain valve means (16) to provide for control of the drain valve by the conjunction of signals from the first threshold switch (41) and the inverse of the third threshold switch (43).

3. System according to claim 2, wherein the third threshold switch (43) includes a threshold control input (V) connected to change the threshold setting of said third threshold switch from a low value of deceleration to a small value of acceleration, and timed delay means (35) are provided, connecting the output of the first threshold switch (41) to the threshold control (V) of the third threshold switch (43) to change the threshold response level of the third threshold switch after response of the first threshold switch (41) and permit prolonged opening of the drain valve (16, 21) unless the wheel is accelerating rapidly, rapid acceleration being indicative of low frictional contact between wheel and road surface, and hence slippery road conditions.

4. System according to claim 2, wherein at least one of the threshold switches (41, 42, 43) includes a threshold control input connected to change the threshold setting of the respective threshold switch;

the threshold switch including an operational amplifier (410), a voltage divider (415, 416, 417) connected to the input of the operational amplifier to determine the threshold level setting of the respective operational amplifier;

a transistor (419) having its emitter-collector path in parallel to a portion of the voltage divider;

the base connection to the transistor forming the threshold control input, conduction or non-conduction of the transistor changing the voltage divider ratio, and hence the voltage applied to the input of the operational amplifier.

5. System according to claim 2, comprising a low pass filter (34) having the rate of velocity change signal applied to its input, the output of the low pass filter being connected to the first (41) and second (42) threshold switches;

the third threshold switch being connected directly to the output of the sensing means.

6. System according to claim 1, comprising a low pass filter (34) having the rate of velocity change signal applied to its input, the output of the low pass filter being connected to the first (41) and second (42) threshold switches.

7. System according to claim 6, wherein the frequency cut off of the low pass filter (34) is approximately 18 Hz.

8. System according to claim 7, comprising a low pass filter (34) having the rate of velocity change signal applied to its input, the output of the low pass filter being connected to the first (41) and second (42) threshold switches.

9. System according to claim 8, wherein the frequency cut off of the low pass filter (34) is approximately 18 Hz.

10. System according to claim 1, further comprising a fourth threshold switch (144) connected to and controlled by said sensing means (31);

a timing circuit (151) connected to the output of the fourth threshold switch (144) and delaying the output signals from said fourth threshold switch for a predetermined interval, after response of said fourth threshold switch, said fourth threshold switch being connected to control said first signal storage means said fourth threshold switch responding to a deceleration signal at a level less than said first threshold switch, to set said storage means upon sensing of a low deceleration level for a period of time exceeding the timing period of said timing circuit.

11. System according to claim 10, wherein said timing circuit comprises a monostable multivibrator (151) and a NAND-gate (152), having its other input connected to the output of said fourth threshold switch (144) to provide an output if and only if:

a. said fourth threshold switch (144) has responded and b. the unstable time period of said monostable circuit (151) has elapsed.

12. System according to claim 10, further comprising an OR-gate (153) connecting, disjunctively, the output of said first threshold circuit (141), or said fourth threshold circuit (144), over said timing means (151) to said first signal storage means (45, 145).

13. System according to claim 1, wherein the change of wheel speed sensing means comprises means (128, 129) to provide separate output signals representative of speeds of individual wheels;

an averaging circuit (154) connected to have the separate output signals of said output signal generating means applied thereto;

and a differentiator (130) having the output from said averaging circuit connected thereto to provide an averaged differentiated rate of change of wheel speed signal.

14. System according to claim 13, further comprising an extreme value circuit (155) connected to have the separate output signals of said output signal generating means applied thereto;
   a comparator circuit (156), the comparator circuit being connected to said extreme value circuit (155) and to said averaging circuit (154) and providing an output when the difference between the average wheel speed signal, and an extreme wheel speed exceeds a predetermined limit.

15. System according to claim 14, further comprising disjunctive coupling means (153) connected to the output of said comparator circuit and to the output of said first threshold circuit, and being connected to and controlling said first signal storage means, so that said first signal storage means will be set upon either
   a. the deceleration threshold level of said first threshold switch (41) being passed, or
   b. the difference between average wheel speed and the extreme speed of any one of the wheels exceeding a predetermined value.

16. System according to claim 14, wherein the extreme value circuit (155) comprises a diode (551, 552), each, connected to the output of a respective output signal generating means (128, 129), and a common output resistor (553) connected to the other terminals of all the diodes, together, to provide an output signal representative of the maximum signal supplied to any one of the diodes.

17. System according to claim 14, wherein the comparator comprises an operational amplifier (560) having one input connected to the output of the extreme value circuit (155) and the other input connected to the output of the averaging circuit (154).

18. System according to claim 17, further comprising a transistor (563) connected to the output of the operational amplifier (560) of the comparator (156), the output of the comparator (156) being taken from the emitter-collector circuit of the transistor;
   and a feedback resistor (565) connected to the output of the transistor (563) and one of the inputs of the operational amplifier (560).

19. System according to claim 13, wherein the averaging circuit (154) comprises
   an operational amplifier (540) and adder resistors (541, 542) coupling the output from said output signal generating means to the input of the operational amplifier.

20. System according to claim 19, further comprising an inverter amplifier (547) connected to the output of the operational amplifier (540).

21. System according to claim 1, further comprising an additional threshold circuit (144) including a fourth threshold switch (144, 151) responding to a level of acceleration less than first threshold switch and timed delay means inhibiting delivery of an output signal from said additional threshold circuit for a predetermined time interval;
   and means (153) connecting the output from said additional threshold circuit to said controlled drain valve switching means (45, 145) to enable said drain valve
   a. after said predetermined time delay and
   b. upon response of said fourth threshold switch or
   c. upon response of said first threshold switch (41).

22. System according to claim 1, including timing means (35, 36) controlling change of threshold response levels, and connected to respective threshold switches (41, 43).

23. System according to claim 22, wherein the timing period of the timing means (35, 36) is about 50 milliseconds.

24. In an automotive brake anti-lock and skid system, to prevent skidding of wheels on road surfaces upon operation of a brake controller (23a), particularly for the rear wheels, in which the wheels have brake fluid cylinders (14, 15),
   means (31) determining acceleration or deceleration of at least one of the wheels;
   means (18, 19) providing a source of brake fluid under pressure and means (17) providing a drain for unpressurized brake fluid;
   pressure valve means (13, 20) and drain valve means (16, 21) connecting the respective wheel brake cylinders to, respectively, the pressure source or the drain;
   means (23a) disabling the system unless the brake controller is operated;
   a first threshold switch (41) having a controllable threshold level and normally responding to a level of wheel deceleration resulting in wheel skidding;
   a controlled drain valve switching means (45) enabled by said first threshold switch and connected to effect draining of pressurized brake fluid from the respective wheel brake cylinder;
   second controlled switching means (50) connected to inhibit supply of pressurized brake fluid to the wheel cylinder when the drain valve is controlled to be open;
   a second threshold switch (42) responding to a level of wheel acceleration without skidding connected to control the threshold level of said first threshold swtich (41) to lower the response of the threshold level, for a predetermined time period after response of said second threshold switch (42) to prevent spurious response of the system, said second threshold switch further being connected to control the drain valve switching means (45) to interrupt draining of pressurized brake fluid from the wheel cylinder upon sensing of wheel acceleration to hold the wheel brake fluid pressure at a constant level upon interruption of supply of pressurized brake fluid to the respective wheel brake cylinder by the second switching means (50) and interruption of draining of fluid from the wheel cylinder.

25. System according to claim 24, further comprising a third threshold switch (43) responding to a level of wheel deceleration of a lesser level than the first threshold switch and providing an enabling signal (46) for the drain valve means (16) conjointly with output from the first threshold switch (41) to permit extended draining by said drain valve means if the threshold level of said first threshold switch is not passed.

26. System according to claim 25, wherein the third threshold switch (43) has a controllable threshold level, said first threshold switch (41) being connected to control the threshold level of said third threshold switch (43) to increase the response level from negative acceleration to positive acceleration, for a predetermined time period (35) after response of the first threshold switch (41) and enable operation of the drain control valve upon subsequent or further response of the first threshold switch after it has first responded.

27. System according to claim 25, wherein said first threshold switch (41) has a threshold level of about −3g; said second threshold switch (42) has a threshold response level of about +1g, with hysteresis to reset at about 0g; and the third threshold switch (43) has a threshold level of about 1g;

and the change in the threshold response levels of the first and third threshold switches is in a direction to greater deceleration, before response of the respective threshold switch.

28. System according to claim 25, comprising a low pass filter (34) having the rate of velocity change signal applied to its input, the output of the low pass filter being connected to the first (41) and second (42) threshold switches;

the third threshold switch (43) being connected directly to the output of the sensing means.

29. System according to claim 24, wherein the controlled drain valve switching means (45) includes a reset timing feature to change state automatically after a predetermined interval to inhibit operation of the drain valve
 a. after said predetermined interval has been exceeded and
 b. in the absence of a signal from the second threshold switch (42) to prevent excessive drainage of brake fluid from the brake cylinder in case of any equipment malfunction.

* * * * *